Dec. 23, 1941.    W. F. GROENE ET AL    2,267,696
BACKLASH ELIMINATOR FOR ORBITAL LATHES
Filed Sept. 9, 1940        4 Sheets-Sheet 4
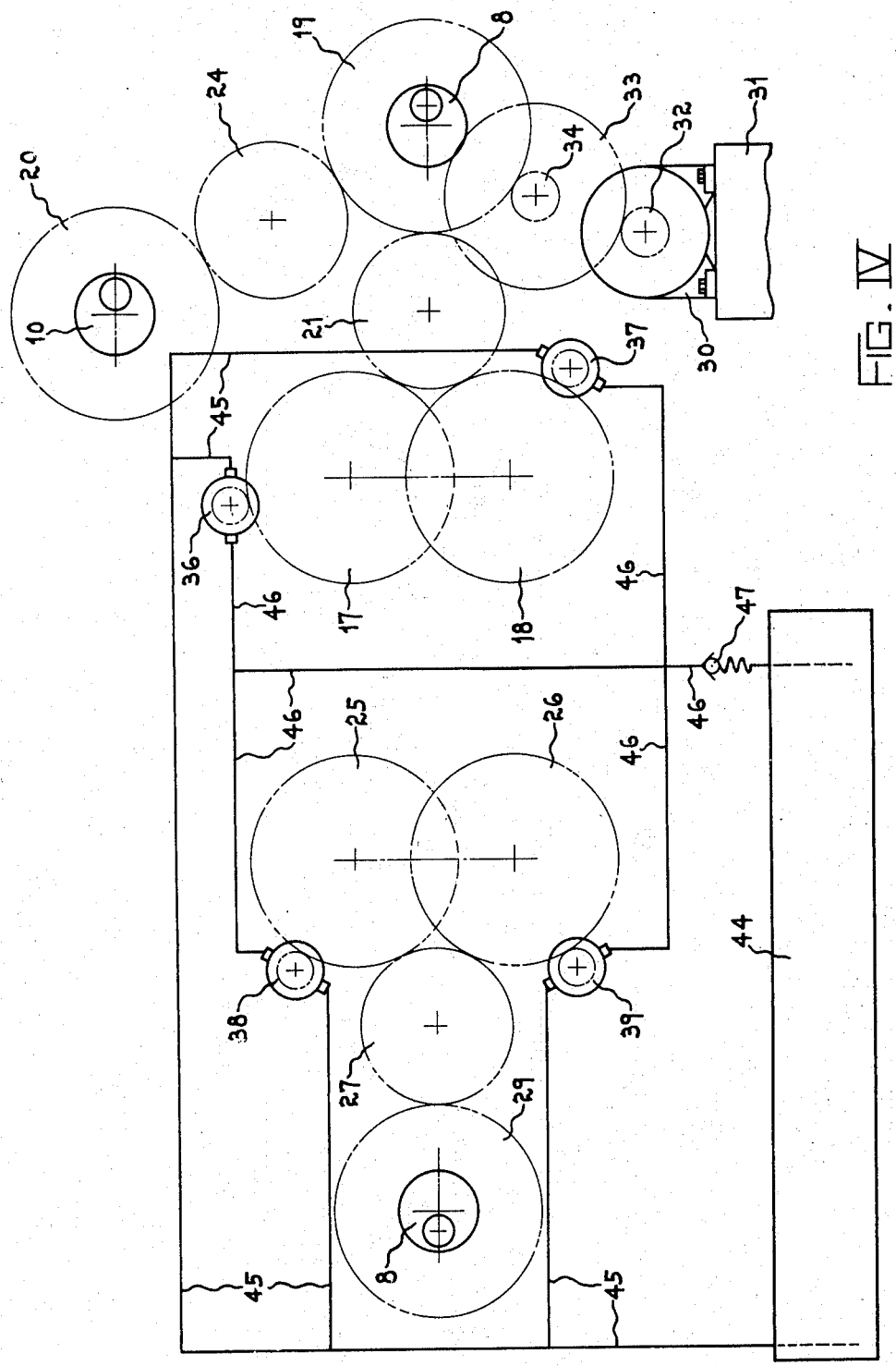
FIG. IV
INVENTORS.
WILLIAM F. GROENE
HAROLD J. SIEKMANN
BY Willard S. Groene
ATTORNEY.

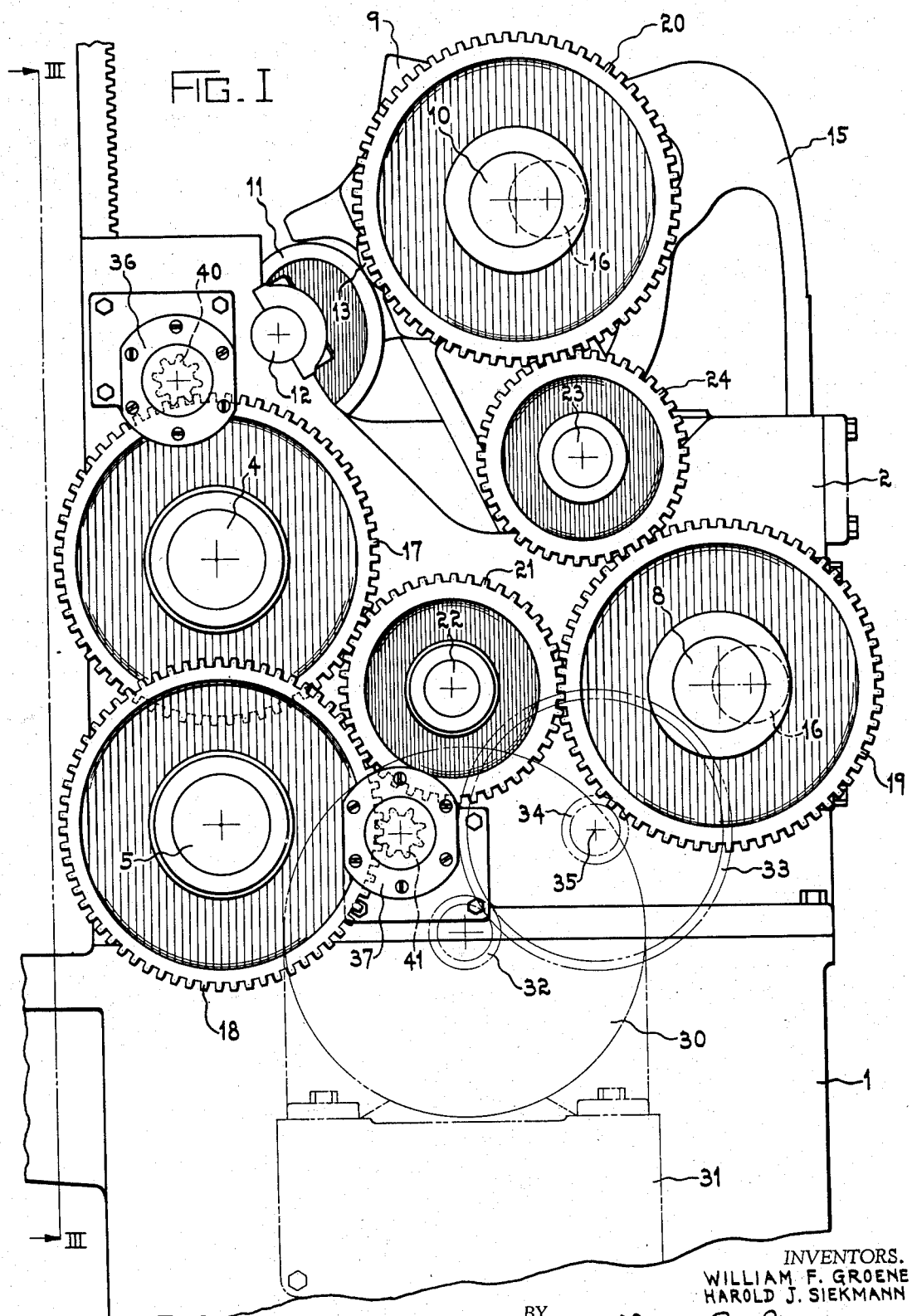

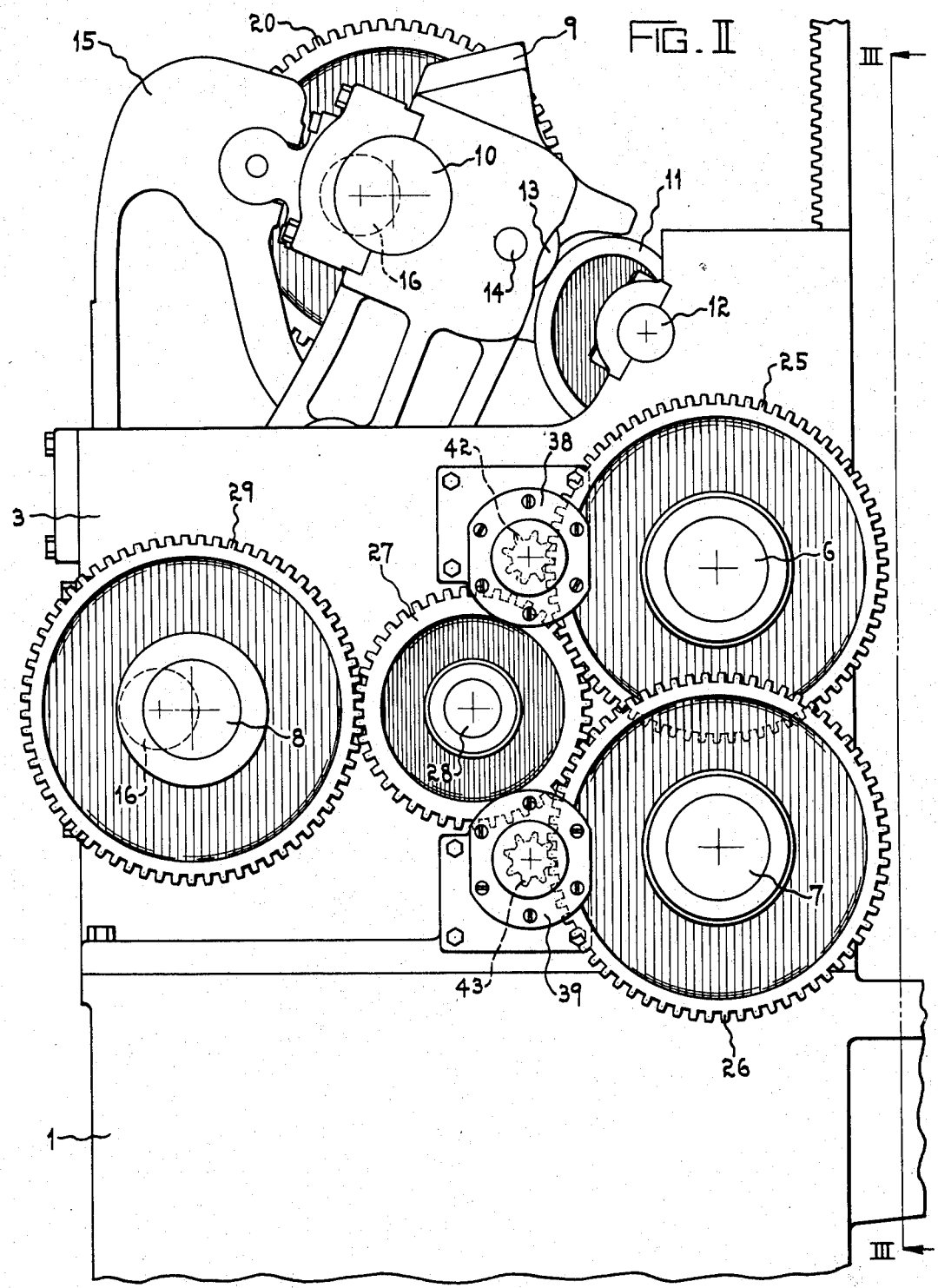

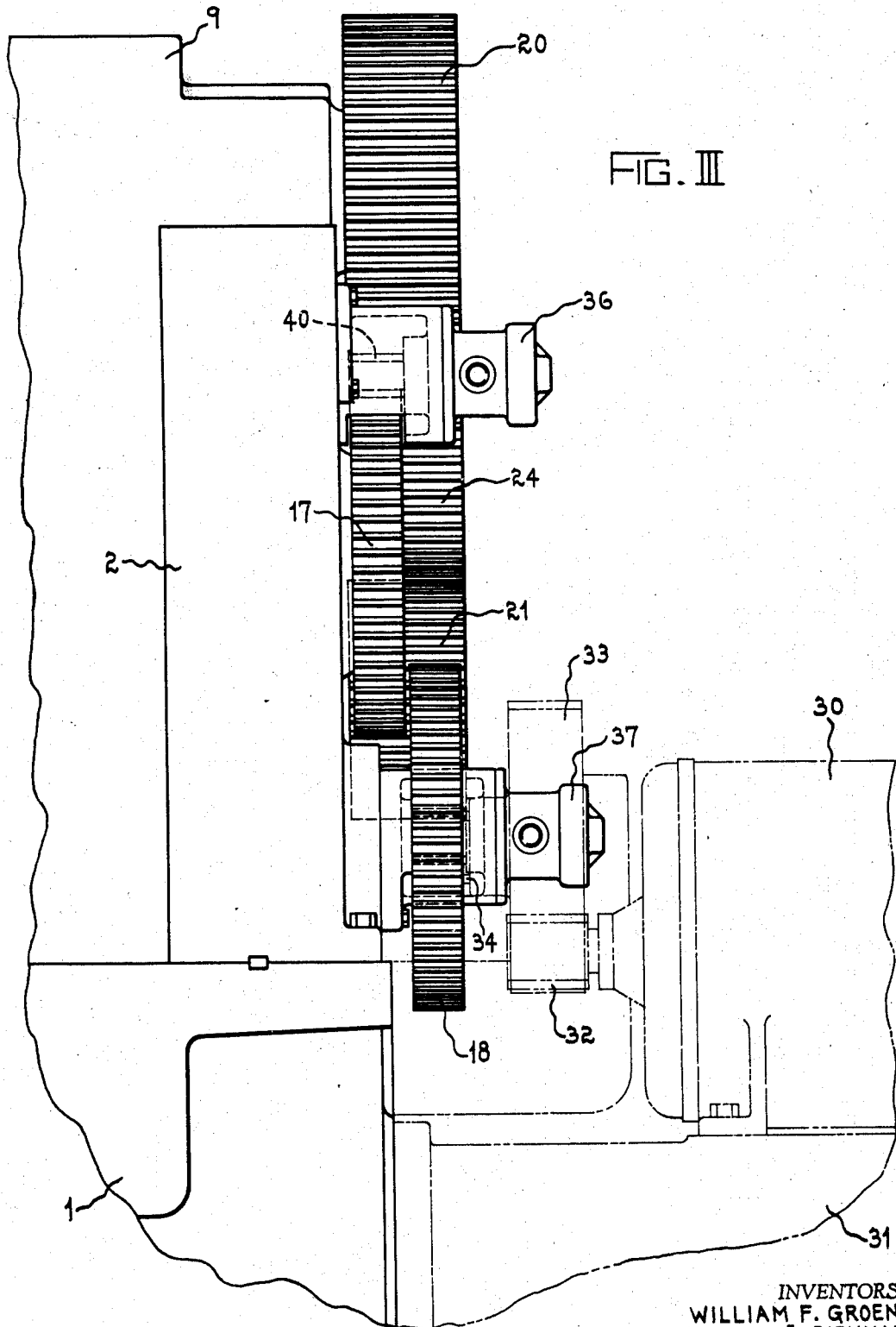

Patented Dec. 23, 1941

2,267,696

UNITED STATES PATENT OFFICE 2,267,696

BACKLASH ELIMINATOR FOR ORBITAL LATHES

William F. Groene and Harold J. Siekmann, Cincinnati, Ohio, assignors to The R. K. Le Blond Machine Tool Company, Cincinnati, Ohio, a corporation of Delaware Application September 9, 1940, Serial No. 356,018

6 Claims. (Cl. 82—2)

This invention pertains to back lash eliminating mechanism for the transmission gearing of orbital lathes of a type particularly shown in Patent Number 2,138,964 of William F. Groene, dated December 6, 1938. More specifically this invention pertains to hydraulic preloading means for the gear transmission mechanism of such multiple spindle orbital lathes which is adapted to prevent back lash and non-uniform synchronous rotation between the work spindles and the master crankshafts of the orbital tool carrying mechanism of the lathe.

In lathes of this orbital type in which work spindles and master crankshafts are rotated in synchronism by means of gearing, it is found that the back lash in the various gears causes slight deviation of the spindle rotation with relation to the orbital movement of the orbitally moving tool carriers mounted on the master crankshafts in the lathe. The result of this non-uniformity of motion between the rotation of the work spindles and master crankshafts causes inaccuracies in the finished product in that the various pin diameters of the crankshaft being turned are not of truly circularly cross section, or they may vary in stroke and indexed position with regard to the other crank pins and the crankshaft line bearings. This deleterious effect is particularly noticeable when the cutting action is coming to a final conclusion and the tools have reached the stationary or dwell position, or also, in instances where finished turning operations are to be undertaken in such lathes, due to the fact that the load conditions on the work spindles is reduced to substantially zero, there is a tendency for the spindle to rotate slightly backward or forward as permitted by the back lash between the various gears mounted on the spindles and the gears of the master crankshafts of the lathe, so as to cause the final finish cutting on the crank pins to be inaccurate.

It is therefore an object of this invention to provide, in conjunction with the gear transmission mechanism of an orbital lathe, hydraulic means cooperating with the gear transmission for at all times preloading the gear transmission and work spindles of the lathe with a predetermined yielding load to maintain contact of the gears of the transmission in the driving direction at all times whether or not the cutting tools are operating upon the work pieces.

Another object of this invention is to provide in a multiple spindle orbital lathe having a plurality of work spindles and master crank actuated tool feeding carriers and interconnecting gear transmission mechanism between the spindles and master crank mechanism, hydraulic loading means for imposing a continuous predetermined yieldable load on the work spindles of said lathe, so as to at all times eliminate possible back lash and intermittent rotation of the work spindles relative to the master crank mechanism of the lathe, independent of whether or not the cutting tools are operating upon the work pieces in the work spindles of said lathe.

Another object of this invention is to provide in an orbital lathe having a plurality of work spindles, a hydraulic pump connected to the spindle gear of each work spindle of said lathe for continuously affecting a back pressure and yieldable load on each work spindle independent of whether or not the cutting tools are operating upon the work pieces of said work spindles so as to at all times prevent back lash and relative intermittent motion between the gears on the work spindles and the gearing connecting said gear to the master crank mechanism of the lathe.

Further features and advantages of this invention will appear in the detailed description of the drawings in which:

Figure I is a right hand end elevation of a conventional multiple spindle orbital lathe of a type shown in Patent #2,138,964, showing the application of this invention to the driving transmission gearing between the master crank orbital mechanism for the tool carriers and the gearing on the work spindles of said lathe.

Figure II is a left hand end elevation of the machine of Figure I showing the application of the hydraulic back lash eliminating mechanism to the gearing transmission on this end of the orbital lathe.

Figure III is a fragmentary front elevation of the machine on the line III—III of Figures I and II, particularly showing the motor drive transmission mechanism and the hydraulic back lash eliminators of the right hand end of the machine.

Figure IV is a diagrammatic showing of the hydraulic circuit interconnecting the hydraulic back lash eliminators for each of the work spindles and the associated circuit diagram as applied to the gear transmission of the orbital lathe.

This invention is shown applied to a typical orbital lathe of a character fully disclosed in Patent #2,138,964 cited above, comprising a base 1, upon which are mounted the side housings 2 and 3 appropriately carrying the work spindles 4, 5, 6, and 7 journaled on suitable bearings as is conventional practice for such lathes. Also carried in these housings is the rear master crankshaft 8 about which is journaled the feeding cradle 9 carrying the upper master crankshaft 10 and which is actuated in feeding motion by the feed cam 11 carried on the feed shaft 12 which engages against the contacting roller 13 mounted on the pin 14 in the cradle 9. Suitable orbitally moving tool carrier units 15 are appropriately mounted on the crank pins 16 of the master crankshafts 8 and 10.

On the left hand side of the machine, as shown in Figures I and III, are provided a series of identical gears 17 and 18 on the work spindles 4 and 5 and gears 19 and 20 on the respective master crankshafts 8 and 10. The gears 17 and 18 are interconnected by means of an idler gear 21 suitably journaled on a stud 22 carried in the housing 2 of the machine, this idler gear 21 in turn being in mesh with the gear 19 on the master crankshaft 8. Mounted on the stud 23 carried by the cradle 9 is the idler gear 24 which interconnects the gears 19 and 20 on the respective master crankshafts 8 and 10 so as to effect synchronous rotation of the work spindles 4 and 5 and the master crankshafts 8 and 10 in a manner fully disclosed in the above mentioned Patent #2,138,964. On the left hand end of the machine, as shown in Figure II, the work spindles 6 and 7 carry identical gears similar to those gears 17, 18, 19, and 21 just described, comprising the gears 25 and 26 fixed on the work spindles 6 and 7 which are interconnected to the idler gear 27 carried on the stud 28 fixed to the machine frame 3, which in turn is connected to the gear 29 on the master crankshaft 8 which gear 29 is similar to the remainder of the gears already described. In this way, the work spindles 6 and 7 are similarly rotated in synchronism with the master crankshaft 8 and the other work spindles and upper master crankshaft 10. This arrangement again being fully shown in the above mentioned patent.

Power for driving the lathe is derived from the main drive motor 30 mounted on a suitable bracket 31 carried on the base 1 of the lathe and has a motor pinion 32 which drives a gear 33 of the compound gear 33—34 appropriately carried on a stud 35 fixed in the frame 2 of the machine, the gear 34 of the compound gear 33—34 being in driving engagement with the gear 19 on the master crankshaft 8 as best seen in Figure I.

With this arrangement it is apparent that there is present necessary back lash between the various spindle gears 17, 18, 25, and 26 with respect to the idler gears 21 and 27 and also back lash present between the gears 19 and 29 and their respective idler gears 21 and 27. It is therefore apparent that the work spindles may have relative rotation in either direction, a small amount due to this back lash between the various gears just mentioned. It has been found that this back lash necessary to the proper running of the gear, is of sufficient amount to cause inaccuracies in the final finish machining operation to be performed on the work pieces, particularly when very light cuts are being undertaken or at the time when the tools are dwelled upon the work at the completion of the roughing cutting operation, to the extent that the crank pins are not of true cylindrical form and also deviate from their accurate index and throw position on the crankshaft when completed. This relative intermittent and reverse rotation occasioned by the back lash between the various gears here described cause the nonsynchronous true rotation of the work spindles with respect to the orbital tool carrying units 15 carried on the master crankshafts 8 and 10 doing very light cutting and final dwell of the tools on the crank pins of the crankshafts being turned. It has been found however, that by applying an appropriate hydraulic pre-loading device of our invention to the spindle gears that this difficulty has been wholly eliminated resulting in greatly improved performance of the machine in so far as the elimination of chatter is concerned which is due primarily to this back lash condition between the various gears and this invention has also resulted in the greatly improved accuracy of the finished product when removed from the lathe. This mechanism comprises a series of hydraulic pumps 36, 37, 38, and 39, the pumps 36 and 37 being mounted, as best seen in Figure I, on the frame 2 of the lathe and have actuating driving pinions 40 and 41 respectively engaging and being driven by the gears 17 and 18 on the work spindles 4 and 5. Similarly noting Figure II, the hydraulic pumps 38 and 39 are mounted on the frame 3 and has driving pinions 42 and 43 which are in turn driven by the gears 25 and 26 on the spindles 6 and 7. All of these pumps are arranged to be driven at all times by the various gears on the work spindles 4, 5, 6, and 7, and these pumps are arranged to derive fluid from a fluid reservoir 44, Figure IV, through the suction line 45 and to discharge the fluid from the reservoir 44, through the discharge line 46, the relief valve 47 and a drain line connected to the reservoir 44. The relief valve 47 may be appropriately adjusted so as to restrict the discharge through these lines 46 to the extent of causing a predetermined amount of power being required to rotate the various driving pinions 40, 41, 42, and 43, of the hydraulic back lash eliminator pumps of a predetermined yieldable amount sufficient to at all times maintain firm driving engagement of the spindle gears 17, 18, 25, and 26 with their respective idlers 21 and 27 and the gears 19 and 29 on the rear master crankshaft 8, so that these gears cannot chatter back and forth or rotate in any but a single accurate driven direction during the operation of the machine independent of the extent of cutting action of the tools on the work pieces of the work spindles of the lathe.

Having thus fully set forth and described our invention what we claim as new and desire to secure by United States Letters Patent is:

1. In an orbital lathe, a rotatable work spindle, orbitally moving tool carrier mechanism associated with said work spindle, gearing interconnecting said work spindle and said orbitally moving tool carrier mechanism, a hydraulic pump driven by said work spindle, fluid pressure control means associated with said pump for effecting a back pressure in said pump for yieldingly opposing rotation of said work spindle, so as to eliminate back lash in said gearing.

2. In an orbital lathe, a plurality of work spindles, orbitally moving tool carrier mechanism associated with said spindles, interconnecting gearing between said spindles and said orbitally moving tool carrier mechanism, to effect synchronous movement of said spindles and said tool carriers of said lathe, fluid pressure operated means associated with each work spindle for yieldingly opposing normal driving rotation of said spindles to eliminate back lash in said gearing.

3. In a lathe, a rotatable work spindle, tool actuating mechanism operable in predetermined movement relative to the rotation of said work spindles, gearing interconnecting said spindle and said tool actuating mechanism, and fluid pressure means for yieldingly opposing free rotation of said work spindle so as to at all times eliminate back lash in said gearing.

4. In a multiple spindle crankshaft lathe, a plurality of work spindles, orbitally moving tool carrier mechanism associated with said work spindles, transmission gearing interconnecting said work spindles and said orbitally moving tool carrier mechanism to effect synchronous movement thereof, a hydraulic pump connected to and driven by each of said work spindles, fluid pressure control means associated with said fluid pressure pump for restricting their rotation to cause them to yieldingly oppose rotation of said work spindles in driving direction so as to eliminate back lash in said transmission.

5. In a multiple spindle orbital lathe, a base, a pair of housings mounted on each end of said base, a plurality of work spindles mounted in each of said housings, gears fixed on each of said work spindles, each of the same size, idler gears journaled on said housings simultaneously engaging the gears of each pair of spindles in each housing, a master crankshaft journaled in said housing having gears connected to said idler gears and of the same size as said spindle gears, a second master crankshaft having a gear of the same size as this spindle gear and interconnected to one of the gears on said first mentioned master crankshaft, a series of tool carriers mounted on said master crankshafts, means for rotating said gear transmission to effect synchronous movement in said work spindles and said orbital tool carriers, fluid pressure pumps mounted on said housings, one connected and driven by each gear of each work spindle, and fluid pressure means for restricting free rotation of said pump when driven by said work spindle gears so as to yieldingly at all times, eliminate back lash in said gearing.

6. In a lathe, a rotatable work spindle, a tool carrier mechanism movable relative to said work spindle, gearing interconnecting said work spindle and said tool carrier mechanism for effecting synchronous movement of said tool carrier relative to the rotation of said work spindle, a hydraulic pump driven by said work spindle, fluid pressure control means associated with said pump, for effecting a back pressure in said pump for yieldingly opposing rotation of said work spindle, so as to eliminate back lash in said gearing.

WILLIAM F. GROENE.
HAROLD J. SIEKMANN.